United States Patent
Sollars et al.

(10) Patent No.: US 10,601,687 B2
(45) Date of Patent: Mar. 24, 2020

(54) DETECTION OF DAMAGED SWITCHED DIPLEX FILTER

(71) Applicant: ARRIS Enterprises LLC, Suwanee, GA (US)

(72) Inventors: Larry D. Sollars, Cumming, GA (US); Syed Mohammed Nasir Hussain, Lilburn, GA (US); Rohan J. Netto, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/005,205

(22) Filed: Jun. 11, 2018

(65) Prior Publication Data

US 2018/0359138 A1  Dec. 13, 2018

Related U.S. Application Data

(60) Provisional application No. 62/517,248, filed on Jun. 9, 2017.

(51) Int. Cl.
*H04L 12/26* (2006.01)
*H04L 12/24* (2006.01)

(52) U.S. Cl.
CPC ............ *H04L 43/08* (2013.01); *H04L 41/06* (2013.01); *H04L 43/0817* (2013.01); *H04L 43/0823* (2013.01); *H04L 43/16* (2013.01)

(58) Field of Classification Search
CPC ..... H04L 41/06; H04L 43/08; H04L 43/0823; H04L 43/16; H04L 43/0817
See application file for complete search history.

(56) References Cited

U.S. PATENT DOCUMENTS

| | | | | |
|---|---|---|---|---|
| 5,934,079 A * | 8/1999 | Han | ...... | H05K 7/206 62/3.2 |
| 8,375,249 B1 * | 2/2013 | LoRusso | ...... | G06F 11/3688 700/286 |
| 9,532,312 B1 * | 12/2016 | Kim | ...... | H04W 52/0277 |
| 9,596,362 B1 * | 3/2017 | Smock | ...... | H04M 19/001 |
| 2010/0234075 A1 * | 9/2010 | Chishima | ...... | H04B 1/406 455/566 |
| 2011/0310519 A1 * | 12/2011 | Baba | ...... | H04N 5/63 361/91.1 |
| 2012/0306284 A1 * | 12/2012 | Lee | ...... | H02J 17/00 307/104 |
| 2012/0313447 A1 * | 12/2012 | Park | ...... | H02J 5/005 307/104 |
| 2017/0311267 A1 * | 10/2017 | Kaechi | ...... | H04W 52/0225 |

* cited by examiner

*Primary Examiner* — Kevin C. Harper
(74) *Attorney, Agent, or Firm* — Bart A. Perkins

(57) ABSTRACT

Methods, systems and computer readable media described herein may facilitate a detection of a damaged switched diplex filter. A CPE device may be equipped with one or more switches and one or more A/D converters. The one or more A/D converters may be utilized to monitor voltage at the one or more switches. In response to a detection of a rise in voltage above a threshold at a switch, upstream transmissions may be disabled at the CPE device.

6 Claims, 4 Drawing Sheets

US 10,601,687 B2

DETECTION OF DAMAGED SWITCHED DIPLEX FILTER

CROSS REFERENCE TO RELATED APPLICATION

This application is a non-provisional application claiming the benefit of U.S. Provisional Application Ser. No. 62/517,248, entitled "Method to Detect Damage to Switched Diplex Filters Due to RF Port Surge Events," which was filed on Jun. 9, 2017, and is incorporated herein by reference in its entirety.

TECHNICAL FIELD

This disclosure relates to a detection of damaged switched diplex filters.

BACKGROUND

The DOCSIS 3.1 standard now allows for different frequency bands to be used for Upstream (US) and Downstream (DS) transmission. Most cable plants in use today have a 42/54 MHz split, meaning that US can be up to 42 MHz and the DS frequencies begin at 54 MHz. In order to provide more upstream bandwidth to customers, DOCSIS 3.1 allows for 42/108, 85/108, and 204/258 MHz diplexer splits. It is desirable to be able to deploy a modem today that works in existing 42/108 MHz plant, and be able to electronically upgrade that modem in the field to work as a 204/258 MHz unit when a cable plant is upgraded. In order to do that, 2 diplex filters may be included in the product, and the product may utilize solid state RF switches to select a diplex filter. The problem with this technology is that the switches themselves are susceptible to lightning surge events. In testing, it is quite common for an RF switch to be partially damaged in such a way that it still passes a signal. Damage to the switch of this type has consequences, and in this application they would produce harmonics in the Downstream band which violated the DOCSIS specifications, and would affect other devices on the cable plant causing outages.

Therefore, a need exists for improving methods and systems for detecting damaged switches.

BRIEF DESCRIPTION OF THE DRAWINGS

Like reference numbers and designations in the various drawings indicate like elements.

DETAILED DESCRIPTION

It is desirable to improve upon methods and systems for detecting damaged switches. Methods, systems and computer readable media described herein may facilitate a detection of a damaged switched diplex filter. A CPE device may be equipped with one or more switches and one or more A/D converters. The one or more A/D converters may be utilized to monitor voltage at the one or more switches. In response to a detection of a rise in voltage above a threshold at a switch, upstream transmissions may be disabled at the CPE device.

Figure 1:
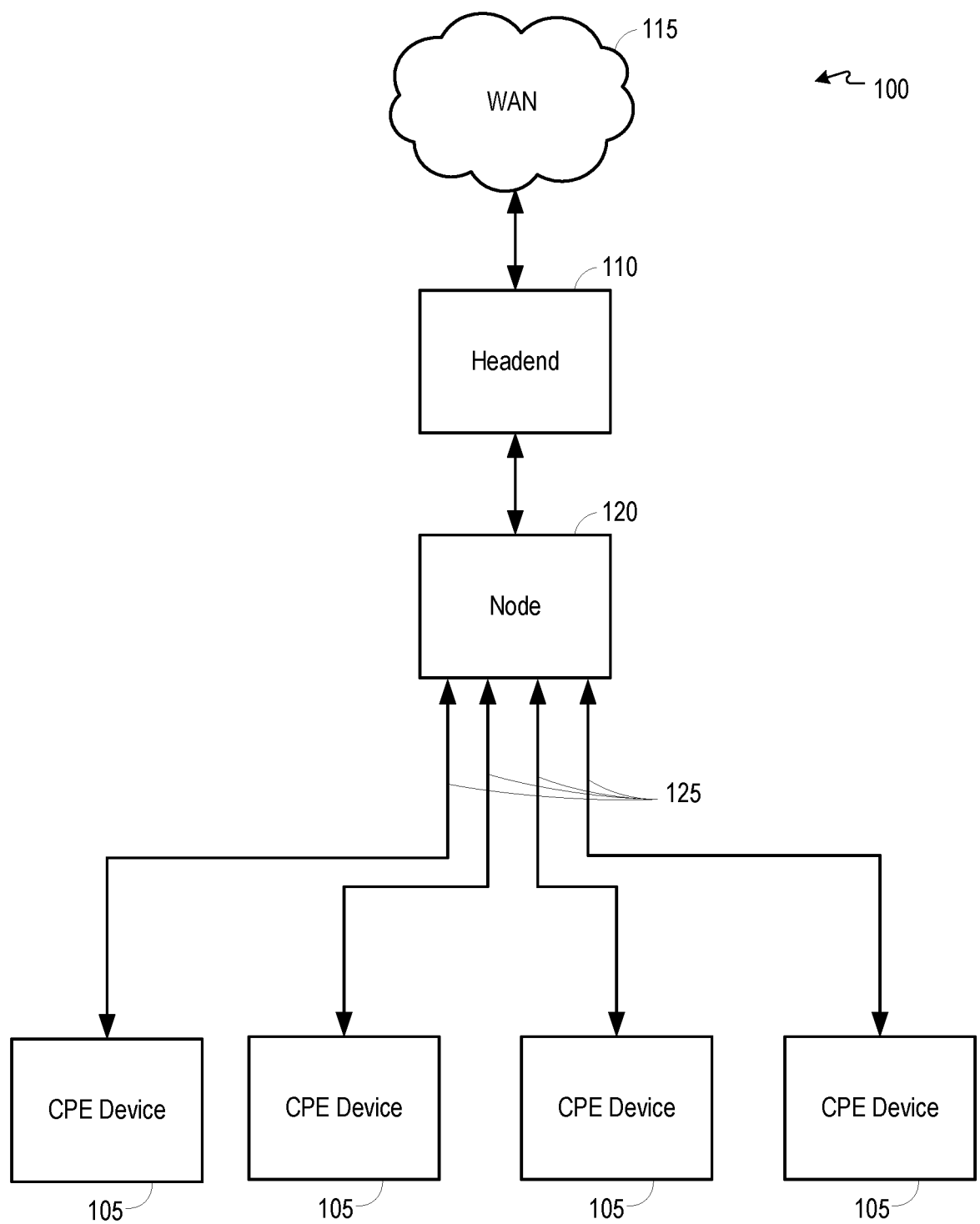
FIG. 1 is a block diagram illustrating an example network environment operable to facilitate a detection of a damaged switched diplex filter.

FIG. 1 is a block diagram illustrating an example network environment 100 operable to facilitate a detection of a damaged switched diplex filter. In embodiments, a CPE device 105 may include one or more switched diplex filters. A CPE device 105 may include a modem, a STB (set-top box), a multimedia gateway, or other device configured to receive downstream communications from an upstream network and to transmit upstream communications to the upstream network. For example, a headend 110 may provide one or more services (e.g., video service(s), data service(s), voice service(s), etc.) to one or more CPE devices 105. The headend 110 may route communications between one or more CPE devices 105 and a wide-area network (WAN) 115. In embodiments, the one or more CPE devices 105 may communicate with the headend 110 through a node 120, wherein the one or more CPE devices 105 are configured to communicate with the node 120 through a transmission line 125 (e.g., RF (radio frequency) cable, coaxial cable, etc.).

In embodiments, a CPE device 105 may include a tuner having one or more A/D (analog-to-digital) converters. The A/D converters may be used to monitor current draw on one or more switches (e.g., RF switches) of the CPE device 105. For example, the A/D converters may be used as a battery charging monitor.

In response to a surge event, such as a lightning surge, current consumption at a switch may increase. In embodiments, the CPE device 105 may monitor equipment for voltage increases resulting from surge events, and the CPE device 105 may disable upstream transmissions in response to an identified event.

Figure 2:
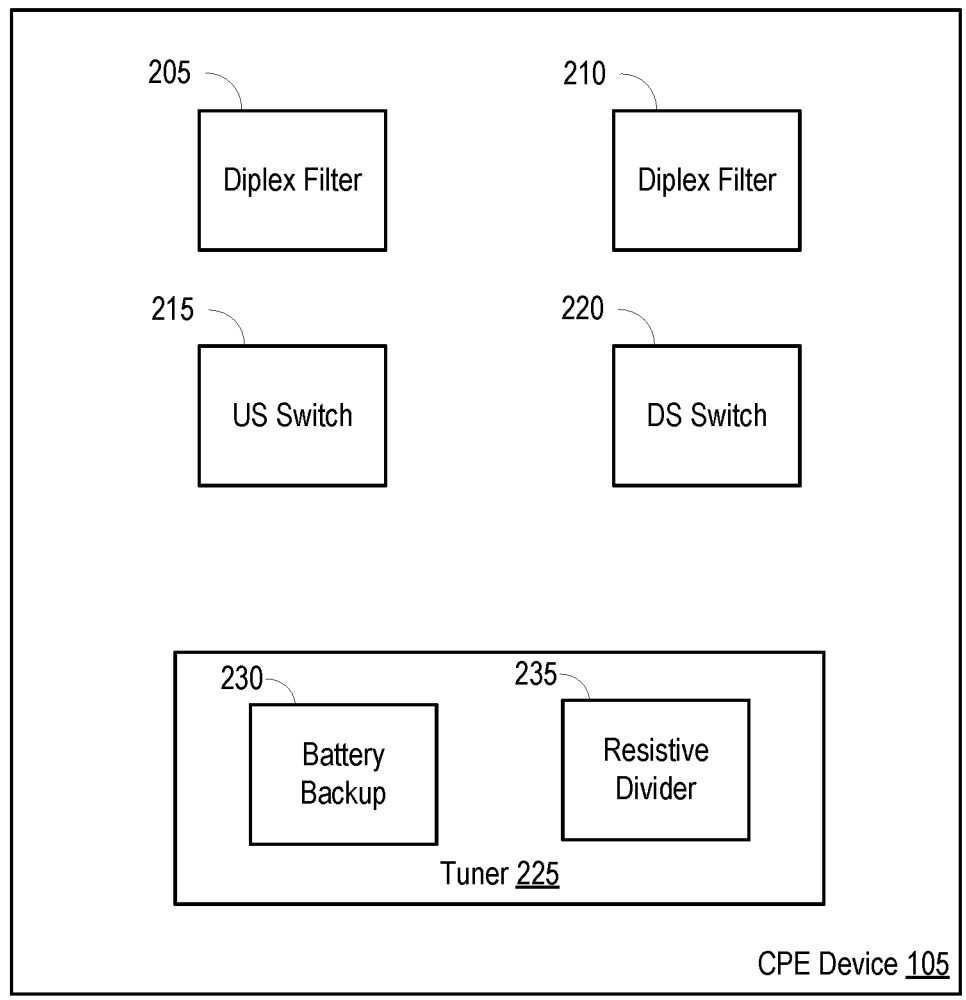
FIG. 2 is a block diagram illustrating an example CPE device operable to facilitate a detection of a damaged switched diplex filter.

FIG. 2 is a block diagram illustrating an example CPE device 105 operable to facilitate a detection of a damaged switched diplex filter. In embodiments, a CPE device 105 may include a first diplex filter 205, a second diplex filter 210, a US (upstream) switch 215, a DS (downstream) switch 220, and a tuner 225. The tuner 225 may include a battery backup 230 and a resistive divider 235.

In embodiments, a CPE device 105 may be equipped with a battery back up (BBU) input 230 at a tuner 225, a current sense resistor at a US switch 215, and a current sense resistor at a DS switch 220. A resistive divider 235 may be used to reduce signals (e.g., 3.3V signals) to a correct operating range of the BBU 230 (e.g., 1.3V). Firmware may read the BBU 230 voltages, and display them to a command line interface. These measurements may be used to detect a rise in voltage by a threshold margin. It should be understood that the threshold voltage margin may vary for each switch. For example, the threshold voltage margin may be set at 9 mV for the DS switch 220 and 6 mV for the US switch 215. The values may be re-read every few minutes and if a shift in the voltage reading is detected, then an alert may be created for the user and/or the MSO (multiple systems operator), and any further upstream transmissions may be disabled in response. This will prevent the damaged unit from negatively impairing other user equipment on the plant.

Figure 3:
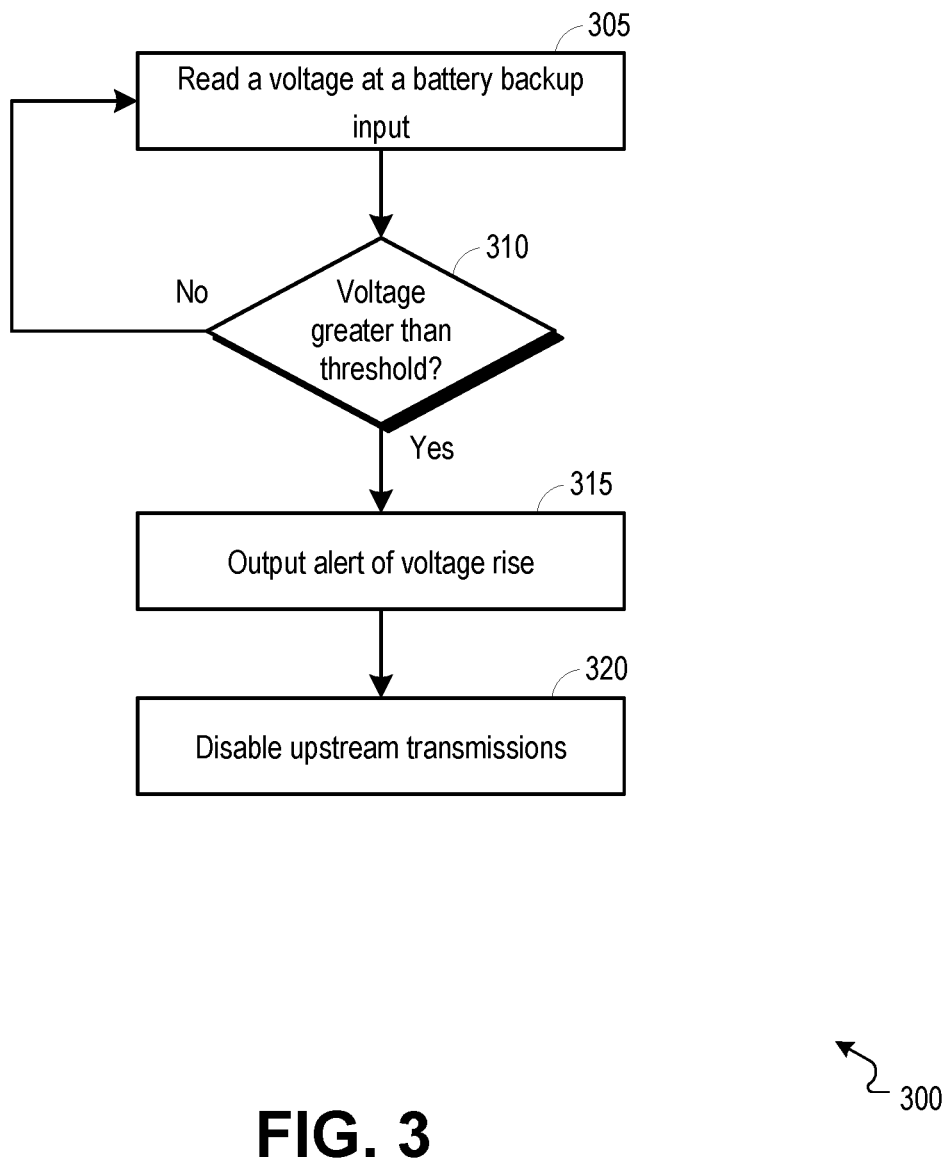
FIG. 3 is a flowchart illustrating an example process operable to facilitate a detection of a damaged switched diplex filter.

FIG. 3 is a flowchart illustrating an example process 300 operable to facilitate a detection of a damaged switched diplex filter. The process 300 can start at 305 where a voltage at a battery backup input of a CPE device 105 of FIG. 1 is read. For example, a voltage at a battery backup 230 of FIG. 2 may be read and displayed at a command line interface.

At 310, a determination may be made whether the voltage read at the battery backup is greater than a threshold voltage. For example, the voltage read at the battery backup may be checked against an expected or historical voltage associated with the battery backup. In embodiments, the battery backup may be associated with a predetermined threshold margin, and if the voltage read at the battery backup is higher than the expected or historical voltage by a margin that is greater than the predetermined threshold margin, a determination may be made that the voltage is greater than the threshold. If the determination is made that the voltage is not greater than the threshold, a next reading of a voltage at the battery backup input may be made at 305.

If, at 310, the determination is made that the voltage read at the battery backup input is greater than the threshold, the process 300 may proceed to 315. At 315, an alert indicating the voltage rise may be output. For example, the alert may be output to a user or MSO.

At 320, upstream transmissions may be disabled. For example, the CPE device 105 may disable further upstream transmissions.

Figure 4:
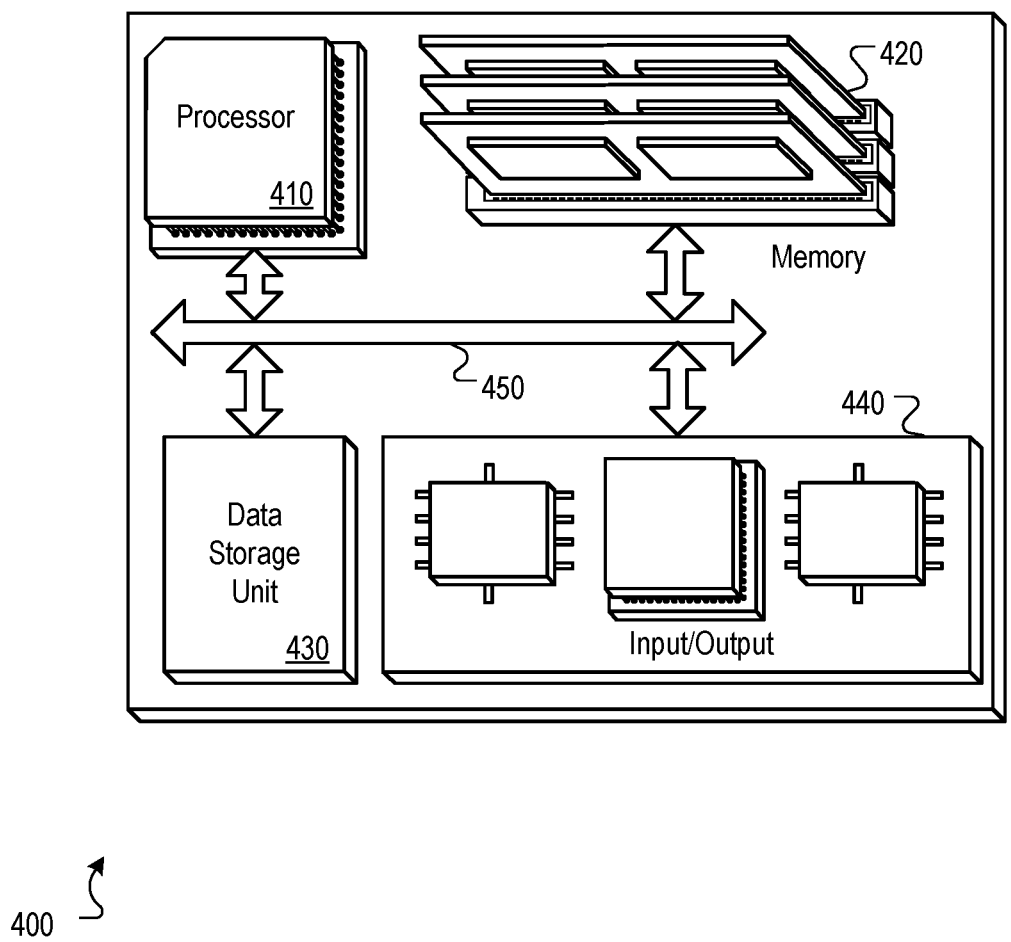
FIG. 4 is a block diagram of a hardware configuration operable to facilitate a detection of a damaged switched diplex filter.

FIG. 4 is a block diagram of a hardware configuration 400 operable to facilitate a detection of a damaged switched diplex filter. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device (e.g., television, STB, computer, mobile device, tablet, etc.). In embodiments, the input/output device can include driver devices configured to send communications to, and receive communications from one or more networks (e.g., WAN 115 of FIG. 1) through a headend 110 of FIG. 1 and node 120 of FIG. 1.

Those skilled in the art will appreciate that the invention improves upon methods and systems for detecting damaged switches. Methods, systems and computer readable media described herein may facilitate a detection of a damaged switched diplex filter. A CPE device may be equipped with one or more switches and one or more A/D converters. The one or more A/D converters may be utilized to monitor voltage at the one or more switches. In response to a detection of a rise in voltage above a threshold at a switch, upstream transmissions may be disabled at the CPE device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    reading a voltage at a battery backup input;
    determining that the voltage is greater than a threshold voltage, wherein the battery backup input is associated with a first switch and a second switch, wherein the voltage read at the battery backup input is associated with either the first switch or the second switch, wherein the first switch is associated with a first threshold voltage, and wherein the second switch is associated with a second threshold voltage;
    outputting an alert indicating a voltage rise; and
    disabling upstream transmissions.

2. The method of claim 1, wherein the first threshold voltage and the second threshold voltage comprise different values.

3. An apparatus comprising:
    a battery backup input; and
    one or more modules that:
    read a voltage at the battery backup input;
    determines that the voltage is greater than a threshold voltage;
    outputs an alert indicating a voltage rise; and
    disables upstream transmissions; and
    a first switch and a second switch, wherein the voltage read at the battery backup input is associated with either the first switch or the second switch, wherein the first switch is associated with a first threshold voltage, and wherein the second switch is associated with a second threshold voltage.

4. The apparatus of claim 3, wherein the first threshold voltage and the second threshold voltage comprise different values.

5. One or more non-transitory computer readable media operable to execute on one or more processors, the computer readable being operable to cause the one or more processors to perform the operations comprising:
    reading a voltage at a battery backup input;
    determining that the voltage is greater than a threshold voltage, wherein the battery backup input is associated with a first switch and a second switch, wherein the voltage read at the battery backup input is associated with either the first switch or the second switch, wherein the first switch is associated with a first threshold voltage, and wherein the second switch is associated with a second threshold voltage;
    outputting an alert indicating a voltage rise; and
    disabling upstream transmissions.

6. The one or more non-transitory computer readable media of claim 5, wherein the first threshold voltage and the second threshold voltage comprise different values.

* * * * *